Patented Nov. 29, 1927.

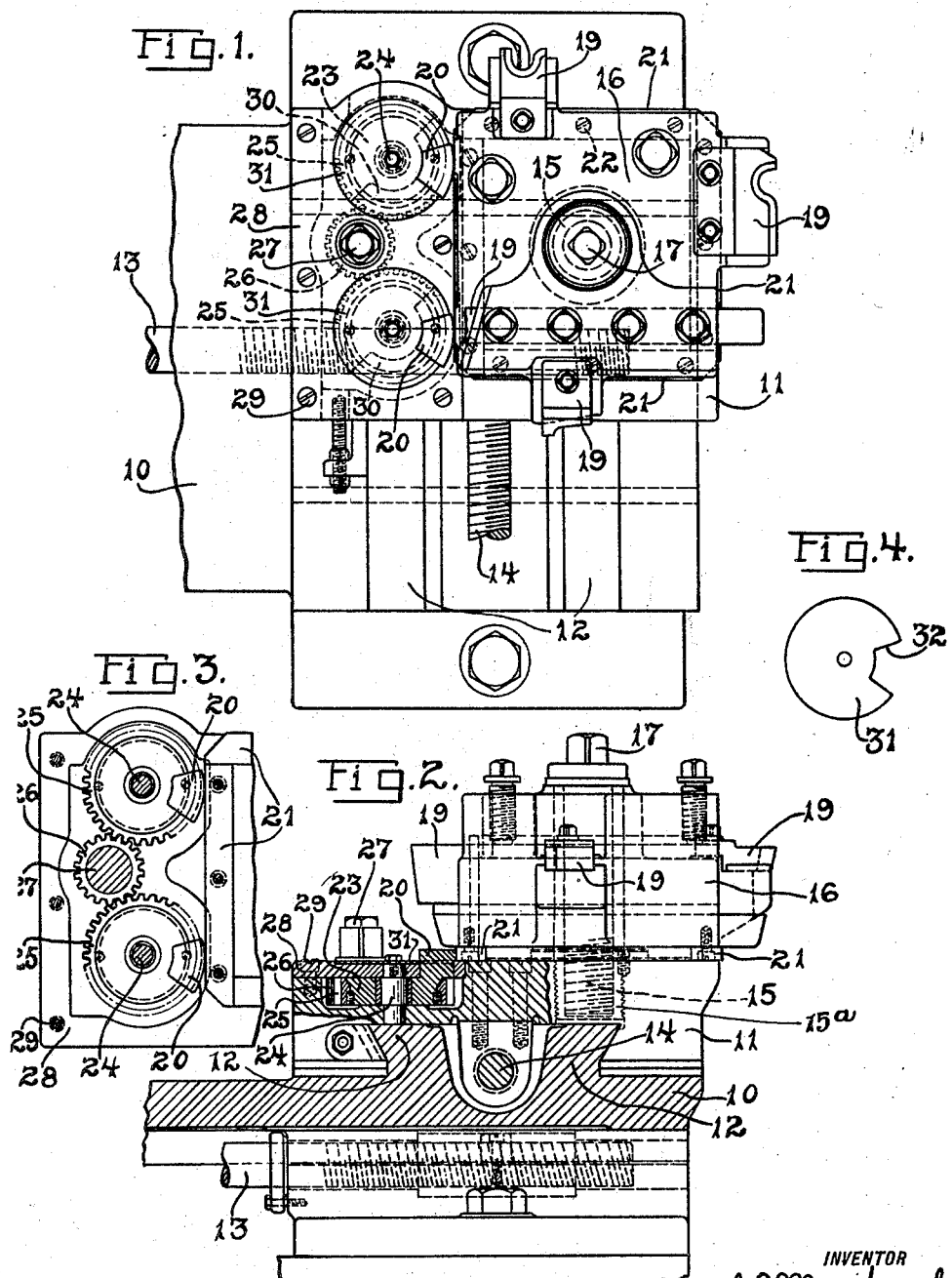

1,650,718

UNITED STATES PATENT OFFICE.

JOHN C. MACDONALD, OF DUNDAS, ONTARIO, CANADA, ASSIGNOR TO NILES-BEMENT-POND COMPANY, OF NEW YORK, N. Y., A CORPORATION OF NEW JERSEY.

TURRET TOOL POST FOR CAR-WHEEL LATHES.

Application filed March 19, 1925. Serial No. 16,768.

This invention relates to turrets and in particular to a tool turret for car wheel turning lathes.

A principal object of the present invention is to provide improved positioning and locking means for the turret, preferably in the form of cams simultaneously rotated and adapted to engage a side surface of the turret.

Another object of the invention is to provide gear means for simultaneously rotating and forcing the cams into and out of engagement with the turret so that the turret may be quickly locked in operative position or unlocked for adjusting it to a new indexed position.

A still further object of the invention is to provide the gears on which the cams are mounted with an intermediate gear in mesh therewith, preferably all of the gears being retained below a cover plate to exclude chips and dirt.

With these and other objects in view my invention consists in the features of construction and operation set forth in the following specification and illustrated in the accompanying drawing.

In the accompanying drawing annexed hereto and forming a part of this specification, I have shown my invention embodied in a tool turret for a car wheel lathe, but it will be understood that the invention can be otherwise embodied and that the drawings are not to be construed as defining or limiting the scope of the invention, the claims appended to this specification being relied upon for that purpose.

In the drawing:

Figure 1 is a plan view of the turret, its locking means and portions of the tool slide adjacent thereto.

Fig. 2 is an elevation of the turret and adjacent parts shown partly in section.

Fig. 3 is a detail plan view of the turret locking means, the fixed cover plate being removed therefrom, and Fig. 4 is a separate view of an auxiliary cover plate.

In the above mentioned drawing I have shown but one embodiment of the invention which is now deemed preferable, but it is to be understood that changes and modifications may be made within the scope of the appended claims without departing from the spirit of the invention.

Briefly and in its broadest aspect, my invention comprises the following principal parts: first, a tool slide of any usual or conventional type; second, a clamping stud or screw outstanding therefrom; third, a turret rotatably mounted on the tool slide about the central bolt or stud; fourth, rotatable cams having eccentric portions adapted to engage a side wall of the turret; fifth, gears carrying the cams and adapted to be simultaneously rotated by means of an intermediate gear in mesh therewith; and sixth, enclosing plates for the gears to exclude chips and dirt.

Referring more in detail to the figures of the drawing, I provide a tool slide 10, portions only of which are shown. It will be understood that this tool slide 10 may be of any preferred construction for the particular objects or uses to which the lathe is to be put and forms no part of the present invention. Near one end of this tool slide 10 is a transversely movable slide 11 preferably engaging a dovetail projection 12 formed on the tool slide 10. Means are provided for advancing the first tool slide 10 directly toward or from the work being turned and also means are provided for advancing the transverse slide 11 along the projection 12 formed on the first tool slide. These means, as shown in the drawing, comprise screws 13 and 14 manually rotatable for making the above mentioned adjustments. Mounted in the transversely adjustable slide 11 is a bolt or screw 15 preferably positioned vertically and rotatably mounting a tool turret 16 thereon. The screw 15, as shown in Fig. 2, is preferably positioned within a sleeve 15ª. By rotation of the bolt or screw 15, as by means of a wrench applied to the squared upper end 17 of this bolt, the turret 16 may be forced downward against the upper surface of the transverse slide 11 to lock the turret 16 in indexed position. Adapted to be clamped to this turret 16 are tools 19 of different shapes depending upon the particular operations to which the lathe is to be put. These tools 19, in the embodiment of the invention shown, are disposed upon all sides of the turret, which is of four sided form.

In order to position the turret 16 properly for groups of tools 19 on the different sides of the turret, cams 20 are provided which are adapted to engage the forward end wall of the turret 16 in any adjusted or indexed position. For this purpose each of the sides of the turret 16 is provided with bearing strips 21 suitably fastened to the turret as by the screws 22 shown. The position of the cams 20 is such that they engage the turret 16 near its corners.

The cams 20 for positioning the turret 16 have eccentric or spiral portions as clearly shown in Fig. 3 and are carried upon or may be formed integrally upon elevated portions of members 23 rotatably mounted adjacent the turret 16 about studs 24 in the transverse tool slide 11. Gears 25 are keyed directly to these cam carrying members 23 concentrically thereto which are in mesh with a third or intermediate gear 26. By rotating the intermediate gear 26 by means of a wrench applied to the squared upper end of the shaft 27 carrying gear 26, the cam carrying gears 23 may be simultaneously rotated to engage or release the cams 20 relative to the turret 16.

Preferably, and as shown in the figures, the gears 25 and the body portions of members 23 are retained below a fixed cover plate 28 secured by means of screws 29 to the transversely adjusted slide 11. This cover plate 28 has arcuate slots 30 cut therein through which the cam portions 20 extend. The gears 25, however, are entirely enclosed below the cover plate 28 within a recess formed in the transversely adjustable slide 11. In this way all chips and dirt are excluded from these movable parts. To close the arcuate slots 30 to prevent chips and dirt entering but permitting free rotative movements of the cam carrying members 23, a thin circular plate 31 is mounted for rotation upon the fixed cover plate 28 concentrically of each of the cam members 23. One rotative cover plate 31 is shown separately in Fig. 4 and is provided with a recess 32, the walls of which closely surround the cam portion 20 of the members 23. By means of this plate 31 the arcuate recesses 30 formed in the fixed cover plate 28 are always completely closed with the cam carrying members 23 in any rotative position.

In using the present form of clamping means, to adjust the turret 16 from one position to the other, the intermediate gear 26 is rotated to disengage the cams 20 from one of the bearing strips 21 on one side of the turret 16. The central bolt or screw 15 is then released, thus permitting the turret 16 to be manually rotated to another indexed position. With the turret 16 in this new rotative position, the intermediate gear 26 is rotated in the opposite direction, thus oscillating the cams 20 simultaneously into engagement with another bearing strip 21 and properly indexing or positioning the turret 16. With the turret 16 in this new indexed or adjusted position, the central bolt or screw 15 is again clamped, so that the turret 16 is indexed and securely locked or clamped in a new operative position, and positively prevented from rotation.

What I claim is:

1. A turret mechanism for lathes comprising in combination, a tool slide, a tool carrying turret rotatably mounted thereon, gears on the tool slide adjacent the turret, means to simultaneously rotate said gears, raised projections on said gears having cam surfaces thereon at their peripheries whereby rotation of the gears engages said cams with a side surface of the turret, and retains the turret against rotation.

2. A turret mechanism for lathes comprising in combination, a tool slide, a tool carrying turret rotatably mounted thereon, gears rotatably mounted on the tool slide adjacent the turret, an intermediate gear in mesh with said first mentioned gears, and cams carried by said first mentioned gears whereby rotation thereof will engage said cams with a side surface of said turret.

3. A turret mechanism for lathes comprising in combination, a tool slide, a tool carrying turret rotatably mounted thereon, gears rotatably mounted on the tool slide adjacent the turret, an intermediate gear in mesh with said first mentioned gears, cams carried by said first mentioned gears whereby rotation thereof will engage said cams with a side surface of said turret, and a cover plate enclosing said gears.

4. A turret mechanism for lathes comprising in combination, a tool slide, a tool carrying turret rotatably mounted thereon, gears rotatably mounted on the tool slide adjacent the turret, an intermediate gear in mesh with said first mentioned gears, cams carried by said first mentioned gears whereby rotation thereof will engage said cams with a side surface of said turret, and a fixed cover plate enclosing said gears and having arcuate slots through which said jaws extend.

5. A turret mechanism for lathes comprising in combination, a tool slide, a tool carrying turret rotatably mounted thereon, gears rotatably mounted on the tool slide adjacent the turret, an intermediate gear in mesh with said first mentioned gears, cams carried by said first mentioned gears whereby rotation thereof will engage said cams with a side surface of said turret, a fixed cover plate enclosing said gears and having arcuate slots through which said jaws extend, and a rotatable cover plate for each cam closing said arcuate slots.

In testimony whereof, I hereto affix my signature.

JOHN O. MACDONALD.